Inventor:-
Jacobus J. Gerritsen,
By:- Smith, Michael and Gardiner,
Attorneys.

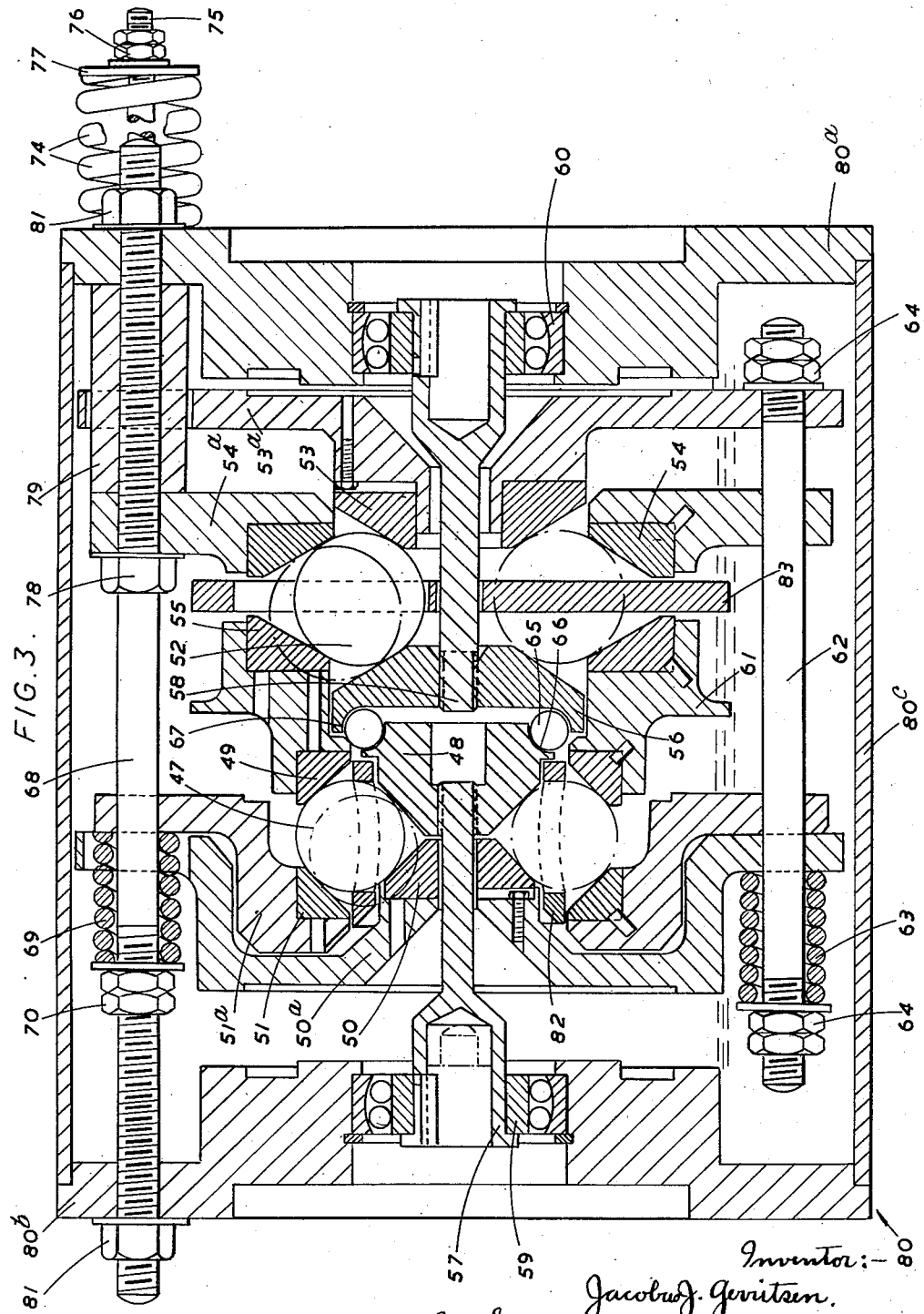

Patented Oct. 30, 1951

2,573,258

UNITED STATES PATENT OFFICE 2,573,258

CONTINUOUSLY VARIABLE SPEED-RATIO TRANSMISSION MECHANISM AND IN SPEED GOVERNING MEANS

Jacobus Johannes Gerritsen, London, England

Application August 6, 1947, Serial No. 766,548
In Great Britain August 6, 1946

18 Claims. (Cl. 74—200)

This invention relates to improvements in continuously variable speed-ratio power transmission mechanism and to governor means for maintaining constant speed of the output shaft of a power transmission system whose input shaft is subject to speed variation of origin independent of the transmission ssytem and its output conditions.

A continuously variable speed-ratio power transmission mechanism according to the invention, comprises essentially a system of balls and cones (which cones will usually be truncated) transmitting rotation by friction, in which the input/output speed ratio is continuously variable (within prescribed limits) by mutually displacing (in their axial direction) two coaxial cones, one male and the other female, and both facing the same way, so as to displace a ball, in contact with both cones, radially with respect to them, the ball being subject to constraint compelling it to rotate about an axis generally perpendicular to the cone-axis, and the ball and at least one of the cones, being elements of the power transmitting train. The second cone is free to rotate and may be a power transmitting element or may be an idler. It is to be understood that, in the foregoing statement and in what follows, the expression "Cones" includes surfaces of revolution with curved generators and having a general resemblance to conical surfaces.

In one preferred form of construction, the ball is keyed to a driving or driven shaft, on which it can slide axially and only one of the cones transmits power, the other being idle. Both cones are free to float axially as well as rotate, while the power transmitting cone is movable axially relatively to the idle cone by control means or automatically, as hereinafter described, for varying the speed ratio. Spring-loaded auxiliary races are provided for pre-loading the ball and cone assembly, and idler balls are provided for balancing the end thrusts.

Preferably such a ball and cone train is duplicated, the power transmitting cones of the two trains being of the same kind (male or female) and being mounted on a common shaft to face opposite ways. The shafts on which the balls of the two trains are keyed then are, respectively, the driving and driven shafts of the complete transmission. The idler cones of the two trains rotate at different speeds and are therefore free of one another but are maintained at constant axial spacing by preloading means and, together, float axially as a unit. In this arrangement, axial displacement of the two power transmitting cones relatively to the two idler cones causes the two balls to be displaced radially in opposite directions, and therefore varies the input/output speed ratios of the two power transmitting trains in the same sense, having regard to the fact that in one train the balls drives the cone and in the other the cone drives the ball. The total variation of ratio is the product of the variations of ratio of each of the two trains. Idler balls may be included, for balancing end thrusts.

In another preferred form of construction, both cones are power transmitting, one being the driver and the other the driven, and the ball is free and rolls on an opposed pair of male and female cones which are both held against rotation but are capable of relative axial displacement. The power transmitting train thus consists of a cone, a ball, and a cone, the other pair of cones being reaction members.

In this type of construction, the ball, being free, may conveniently be duplicated or replaced by a complete race of balls, thus distributing the driving loads and balancing the end thrusts.

Preloading means are provided for holding the power-transmitting and reaction cones in rolling contact with the ball or balls, and, preferably, each pair of cones, consisting respectively of a male power-transmitting cone and a female reaction cone, and a male reaction cone and a female power-transmitting cone, are independently pre-loaded, so that these pairs constitute two units with mutual freedom of axial displacement, which may be manually controlled or subject to the operation of automatic governing means, whereby the radial position of the ball or balls is altered. It will be evident that, since the male and female reaction cones are both non-rotative, the ball in rolling on them is compelled to rotate about an axis generally radial of the cones, and that the speed-ratio of the rotative power-transmitting cones will depend on the radial distance of the ball-centre from the cone-axis, which is continuously variable by mutual axial displacement of the two pairs of cones, each consisting of a power-transmitting and a reaction cone. Usually one of these pairs will be located with respect to the casing of the mechanism, the other being axially slidable therein.

Two or more trains of mechanism of this kind may be combined in series, being arranged coaxially and with one of the power-transmitting cones of one train, either the male or the female, formed integrally (or connected by a common shaft) with the corresponding cone of the same kind (male or female) of the next train of the series. In a two-stage arrangement of this kind, the pre-loading means may be common to both stages, and a common control (manual or automatic) may be provided, there being two independently pre-loaded units with freedom for controlled mutual axial displacement, one comprising of two male power-transmitting cones and two female reaction cones, and the other comprising two female power-transmitting cones and two male reaction cones, the power-transmitting cones of one unit being connected for common rotation and those of the other respectively connected to input and output shafts supported coaxially in a common casing.

The reaction cones may be located axially intermediate two pairs of power-transmitting cones, in which case the two reaction cones of each unit may be formed integrally with one another. If the power-transmitting cones are located axially intermediate two pairs of reaction cones, the two power transmitting cones which rotate together may be formed integrally with one another.

Since the radial displacements of the two balls (or sets of balls) consequent on mutual axial displacement of these two units are in opposite senses, so that the speed-ratios of the two series-connected trains of mechanism are respectively greater and less than unity, it is necessary, in order that there may be a variable overall speed-ratio, for the two trains, though comprising similar combinations of elements, to differ in respect of their geometrical characteristics, such as size of ball or/and cone-angles.

The invention also includes a self-governing transmission system, comprising a continuously variable speed-ratio transmission mechanism, controlled by a displaceable member, which is subjected to a force increasing continuously with input speed and tending to move the member in the direction for decreasing the output/input speed ratio, and is subjected in the opposite direction to the effort of spring means, whose rate, which may be non-uniform, is such that at all input speeds (within the design range, corresponding to the range of speed-ratios available) the displaceable member is in stable equilibrium under the opposed forces at positions, for which the selected speed-ratios are inversely proportional to the input speed, thus maintaining the output speed constant.

This self-governing transmission requires for its operation the conditions that variations of input speed arise from causes external to the transmission itself and its output load, and that the input power is automatically adjusted to the output power requirements, as will be the case, for instance, when the available input power is always in excess of the output power requirements plus transmission losses, the excess being absorbed by some other load, which, in conjunction with a separate control or otherwise, determines the input speed. Thus one application of this self-governing transmission is to the driving of "constant speed" auxiliaries by a main power plant whose output is mainly expended on its primary load. The auxiliary machine driven through the self-governing transmission takes what power it needs from the main shaft of the power plant whose speed may vary, while the self-governing transmission automatically maintains the auxiliary machine's speed constant.

A self-governing transmission system as hereinabove defined, may incorporate a continuously variable speed-ratio transmission mechanism as already described, which lends itself readily to the automatic control of output speed. The combination of these features will be better understood from the following description of two specific examples with reference to the accompanying drawings of which, Fig. 1 is an axial section of the first example;

Fig. 3 is an axial section on the line A—B—C of Fig. 2; and

Figure 1:
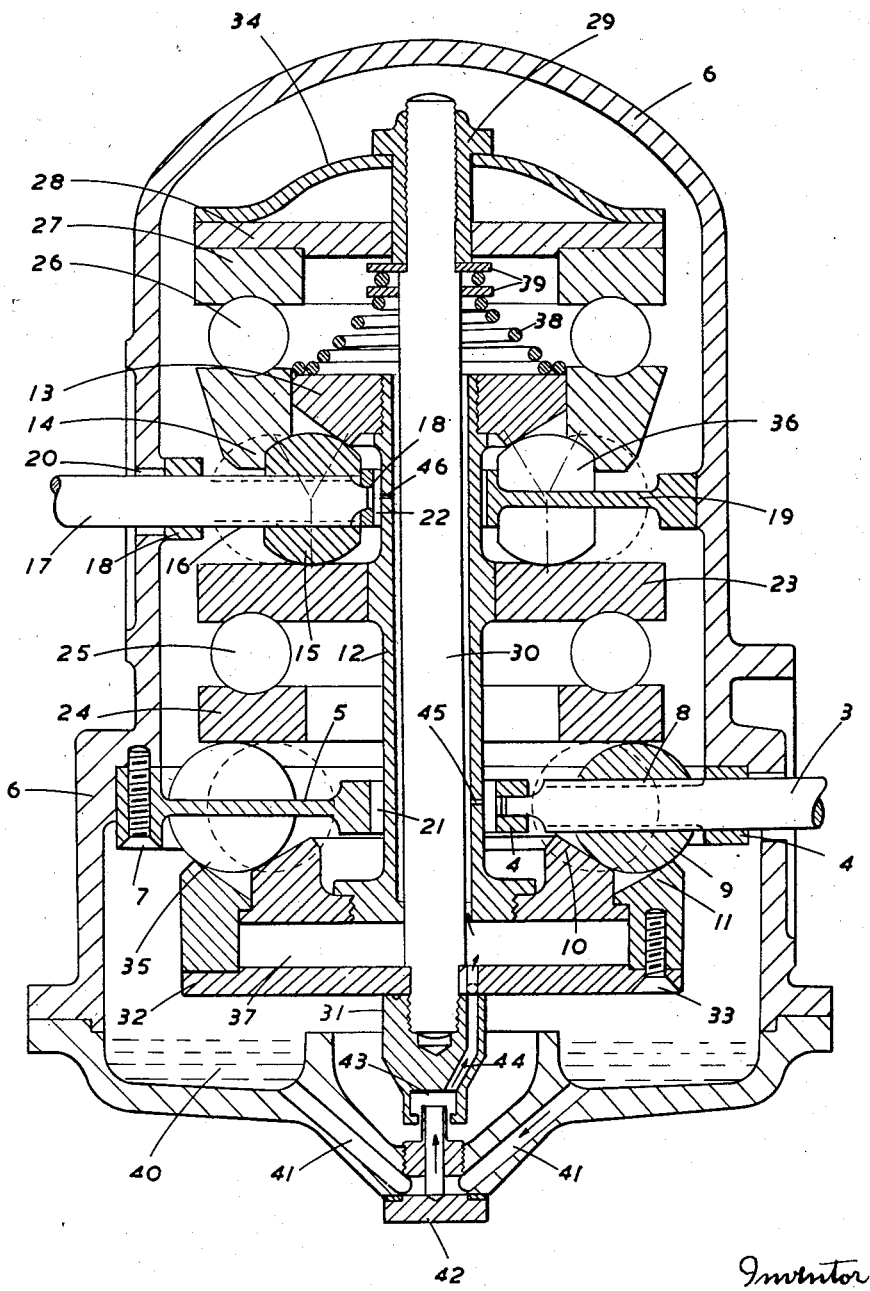

In the first example (Fig. 1), an input shaft 3, supported in bearings 4, of a plate 5, secured to a casing 6 by screws 7, has splines 8 engaged by internal splines of a hardened ball 9, which engages a male power-transmitting cone 10 and a female idler cone 11, concentrically surrounding cone 10. The faces of cones 10, 11 have equal angles. Cone 10 is secured to a hollow shaft 12, which is perpendicular to the input shaft 3, and to whose opposite end is secured a male cone 13 corresponding to cone 10 and facing the opposite way. Cone 13 is surrounded by a concentric female idler cone 14 of the same angle as cone 13, and cones 13, 14 engage a ball 15 internally splined to engage and slide on splines 16 of an output shaft 17, perpendicular to shaft 12 and supported in bearings 18 of a plate 19. Shaft 17 projects outside the casing 6 through a clearance hole 20, and the plate 19 is centred by the casing and prevented from rotating therein by keys (not shown), but is not positively located therein axially (of shaft 12) being free to float in the axial direction. The shaft 12 passes through clearance holes 21, 22, in plates 5 and 19, respectively.

An axially and rotationally floating disc 23, centred on shaft 12, has a flat face engaging ball 15 and its other face has a ball-race track formed in it. A freely floating ring 24 has a flat face engaging ball 9, its other face having a ball-race track, which, together with the corresponding track of disc 23, locate a row of balls 25. Similar ball-race tracks locating a row of balls 26 are formed in the idler cone 14, and a ring 27 is carried by a plate 28 centred on an extension of a preloading nut 29 screwed onto a central shaft 30, which shaft is coaxial with shaft 12 and to which shaft 30 is secured by a nut 31 a plate 32 secured to the idler cone 11 by screws 33. Plate 28 floats axially on the nut 29, which has a flange engaging the centre of a dished preloading spring 34, whose circumference engages the plate 28. The whole assembly is preloaded by screwing down nut 29. To distribute the axial preload symmetrically about the axis of shafts 12 and 30, idler balls 35, 36 are placed between cones 10, 11 and ring 24, and between cones 13, 14 and disc 23, the plates 5 and 19 being apertured to accommodate said idler balls and to locate them symmetrically with respect to balls 9 and 15, respectively. Each set 35 and 36 of idler balls may consist of any convenient number from one upwards. The assembly as a whole is located axially in the casing by the plate 5 only, and the slight decrease of the distance separating the axes of shafts 3 and 17, which occurs on applying the preload, by elastic compression of balls 9, 35; 15, 36; and 25 and of members 23, 24, is accommodated by the axial freedom of plate 19 and the clearance of shaft 17 in hole 20.

Change of output/input speed ratio is effected by relatively displacing the assemblies 10, 12, 13 and 11, 14, 26 to 34, axially, thus displacing balls 9, 15 radially in opposite directions, and varying the contact radii of cones 10, 13 in opposite senses. The displaced position of the balls 9, 35; 15, 36 are shown in chain-dotted lines. The speed ratios of shafts 3:12 and 12:17, respectively, are therefore varied in the same sense.

Relative displacement of the two assemblies mentioned above may be accomplished by hydraulic pressure admitted into the cavity 37 enclosed by cone 11, plate 32 and cone 10 which slides as a piston in cone 11, the hydraulic pressure being balanced by a spring 38 acting between cone 13 and a ball-thrust collar 39 retained by nut 29.

The speed-ratio in the example illustrated is controlled automatically to drive the output shaft 17 at constant speed for all values of the speed of the input shaft 3 within the range corresponding to the limits of the speed-ratio variation, by relying on the centrifugal pressure developed in the cavity 37 by the rotation of members 10, 11, 32 to move the assembly 10, 12, 13 against spring 38, whose rate is so adjusted that at any input speed within the range available, the centrifugal pressure in cavity 37, which is approximately proportional to the square of the input speed, balances the spring load at a displacement of assembly 10, 12, 13 relative to assembly 11, 14, 26 to 34, giving the correct overall speed ratio for maintaining the output shaft speed constant. The rate of spring 38 will usually be non-uniform, but if the range of speed-ratio is small, approximately accurate governing may be obtainable with a spring of uniform rate.

The hydraulic fluid is oil, contained in an annular sump 40 of the casing 6, which sump is fed by gravity through channels 41 in the base of the casing to a ported hollow plug 42 which constitutes a stand pipe projecting with a fine clearance into a cavity 43 in the lower end of nut 31, whence the oil is pumped by the centrifugal action of an inclined passage 44 into the cavity 37. The centrifugal pumping action of passage 44 is powerful enough to maintain a continuous circulation through cavity 37, the overflow being passed up the clearance between shafts 12 and 30 and vented for lubrication purposes through ports 45 and 46.

In the illustrated example, the vertical angles of cones 10, 11, 13, 14 are all equal, but this is not essential, and they may be all different provided the half-vertical angles A, B, C, D, of cones 10, 11, 13, 14, respectively, satisfy the relationship $$\frac{\tan A}{\tan B} = \frac{\tan C}{\tan D} \tag{1}$$

Figure 2:
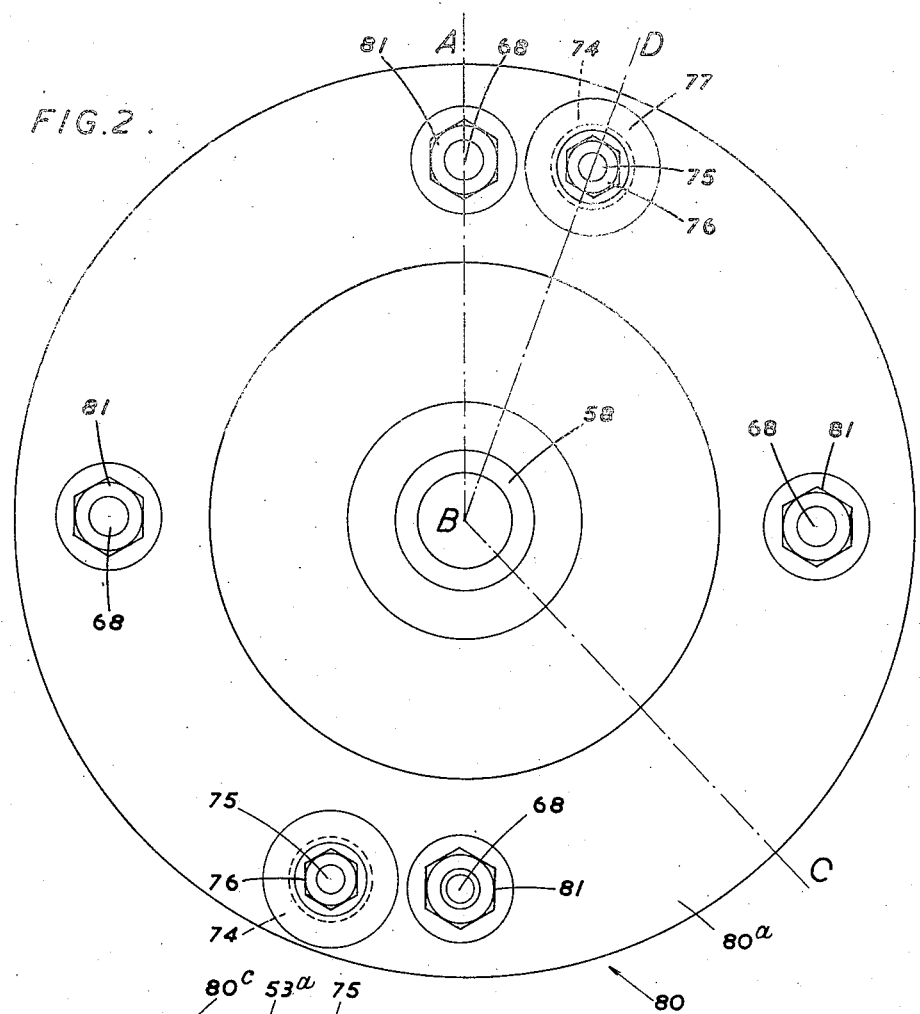
Fig. 2 is an end elevation of the second example.
Figure 4:
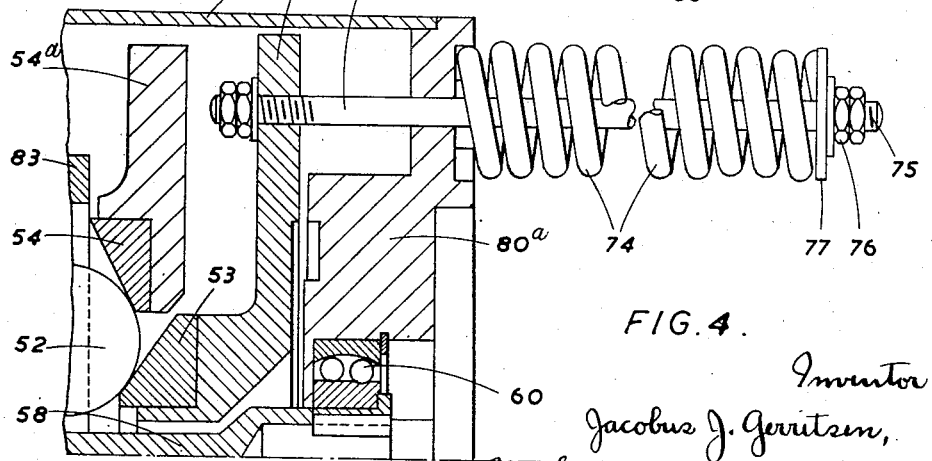
Fig. 4 is a scrap-section on the line B—D of Fig. 2.

In the second example (Figs. 2–4), a row of balls 47, retained in a cage 82, is located between two female cones 49, 51 and two male cones 48, 50, respectively facing the same way as cones 49, 51, and a second row of balls 52, retained in a cage 83, is likewise located between two female cones 54, 55 and two male cones 53, 56, respectively facing the same way as cones 54, 55. Cone 48 is keyed on to an input shaft 57, and cone 56 is keyed on to an output shaft 58. These shafts are supported in a three piece casing 80 in bearings 59, 60, respectively; all the cones and the two shafts being coaxial. Cones 49 and 55, which face opposite ways, are rigidly supported in a common housing 61. The latter can float axially and is free to rotate.

Cones 50, 51, 53, 54 are supported in housings 50ª, 51ª, 53ª, 54ª, respectively, each provided with apertured flanges, which accommodate two sets of threaded tie-rods 62 and 68. Rods 62 have a sliding fit in the apertures of the flanges of all four cone-housings 50ª–54ª, and prevent relative rotation of these housings, while allowing mutual axial displacement thereof. Rods 68 pass through the end members 80ª, 80ᵇ of the casing 80 and carry external clamping nuts 81 which secure the end members 80ª, 80ᵇ to the barrel 80ᶜ of the casing. Rods 68 also carry tubular distance pieces 79 and nuts 78 by which the cone-housing 54ª is secured to the casing. The flange apertures of housing 51ª have a sliding fit on rods 68, and flange apertures of cone-housing 53ª through which the rods 68 pass, are enlarged to accommodate the distance-pieces 79 with clearance.

Rods 62 carry pre-loading springs 63 which react directly on the flange of cone-housing 50ª and indirectly through preloading nuts 64 and the tie-rods 62 on the flange of cone-housing 53ª to draw these cone-housings together. Similarly, rods 68 carry pre-loading springs 69 which react between the flange of cone-housing 51ª and preloading nuts 70 screwed onto the rods 68 which are fast in the casing and in cone-housing 54ª, the flange apertures of cone-housing 50ª through which the rods 68 pass being enlarged to accommodate the springs 69 with clearance.

The rear faces of cones 48 and 56 are provided with thrust-and-radial ball races 66, 67 respectively, between which runs a row of balls 65, the ball-bearing assembly 65, 66, 67 serving as a spigot bearing aligning the unsupported ends of shafts 57, 58.

The faces of cones 51 and 48 are parallel and so are the faces of cones 54 and 56. Consequently, displacements of the balls 47 and 52 along the generators of these cone-faces will not disturb the relative axial positions of these cones and their housings, and since the housing 54ª of cone 54 is fast in the casing, the group of cones 48, 51, 54, 56 with their housings constitutes a unit fixed axially with respect to the casing and preloaded by the springs 69 whose reaction on cone-housing 51ª is transferred to the end member 80ª of the casing through cone 51, balls 47, cone 48, bearing assembly 65, 66, 67, cone 56, balls 52, cone 54, cone-housing 54ª and distance-pieces 79, and thence back through rods 68 and nuts 70 to the other end of the spring 69.

Similarly, the faces of cones 50 and 49 are parallel and so are those of cones 55 and 53, and, consequently, the mutual axial relationships of these four cones will not be changed by displacements of the balls 47, 52 along their generators, so that the group of cones 49, 50, 53, 55 with their housings constitutes a unit free to move axially with respect to the unitary group 48, 51, 54, 56 etc. and pre-loaded by springs 63 whose reaction on cone-housing 50ª is transferred to cone-housing 53ª through cone 50, balls 47, cone 49, cone-housing 61, cone 55, balls 52 and cone 53, and thence back through rods 62 and nuts 64 to the other end of springs 63.

Rotation of cone 48 by the input shaft 57, causes the balls 47 to roll on the non-rotary reaction cones 50, 51 and rotate cone 49. In rolling on the reaction cones, the balls rotate on axes generally radial of the cones. The rotation of cone 49 is transferred by housing 61 to cone 55 which causes the balls 52 to roll on the non-rotary reaction cones 53, 54 and to drive cone 56 and output shaft 58. The overall ratio is varied by shifting the unitary group comprising cones 49, 50, 53, 55 axially with respect to the unitary group comprising cones 48, 51, 54 and 56, which group is axially located in the casing. Such displacements cause the balls 47, 52 to shift outwardly or inwardly in opposite directions. The overall input/output speed ratio is the product of the separate speed ratios of cones 48:49 and 55:56, of which one is greater, and the other less, than unity. In the example shown in the drawings, axial displacement of the group 49, 50, 53, 55 etc. to the left, increases the product of ratios 48:49 and 55:56, i. e. the overall input/output speed ratio, a contrary displacement causing the overall ratio to decrease. The balls 47, 52 are shown in chain-dotted lines in positions taken up when the group 49, 50, 53, 55 etc. is so displaced. Control of speed ratio may be exercised in any convenient way.

In the example illustrated, the semi-vertical angles of cones 48, 49, 50, 51, which cooperate with balls 47, are all 45°, and those of cones 53, 54, 55, 56, cooperating with balls 52, are 60°, and the balls 52 are larger than the balls 47. It is not necessary, however, that the cones in each such group should have equal angles, not even that the opposed male and female cones of each of the pairs 48, 51; 49, 50; 53, 55 and 54, 56, should have the same angles. The minimum necessary conditions to be satisfied by the cone angles are:

$$\frac{(\cot E - \cot A) \times (\cot K - \cot F)}{(\cot C - \cot D) \times (\cot G - \cot L)} = 1$$

$$\frac{(\cot A + \cot D) \times (\cot G + \cot K)}{(\cot C + \cot E) \times (\cot F + \cot L)} = 1 \quad (2)$$

where A, C, D, E, F, G, K, L, are the semi-vertical angles of cones 48, 49, 50, 51, 53, 54, 55, 56, respectively. If the angles of the opposed cones 48, 51; 49, 50; 53, 55 and 54, 56, were not respectively equal, cones 49, 55 would be displaced axially, with respect to cones 50, 53, and cones 48, 56 with respect to cones 53, 54 within the respective groups 49, 50, 53, 55 etc. and 48, 51, 54, 56 etc., when the balls 47 and 52 are displaced radially by axial displacement of the whole group 49, 50, 53, 55 etc. relatively to group 48, 51, 54, 56 etc.

The axial displacement of the unitary group 49, 50, 53, 55 etc. may be controlled manually if desired, but in the example illustrated an automatic means of control, responsive to changes of input speed for maintaining output speed constant, is shown.

The centrifugal force extended by balls 47 tends to separate cones 49, 51 axially, and thus urge the movable unitary group 49, 50, 53, 55 etc. to the right; while that exerted by balls 52 tends to separate cones 54, 55, and urge the movable unitary group to the left; the stationary group and casing acting as fixed abutment in each case. Since, however, the balls 52 are larger than balls 47 and the vertical angle of cones 54, 55 is wider than that of cones 49, 51, the centrifugal force of balls 52 is greater and acts at greater mechanical advantage than that of balls 47, so that the net tendency of the centrifugal force is to move group 49, 50, 53, 55 etc. to the left. This tendency is balanced by external governor springs 74, of which the left hand ends abut on the casing end 80ª and the other ends abut on washers 77 backed by nuts 76 screwed onto long studs 75 screwed into the cone-housing 53ª forming part of the movable unitary group 49, 50, 53, 55 etc.

By employing springs 74 with appropriately selected rate, which may be non-uniform, but in some instances may be substantially uniform, the balance of centrifugal forces and opposing spring load may be made to select, automatically, a position of stable equilibrium of the movable unitary group 49, 50, 53, 55 etc. relatively to the fixed group 48, 51, 54, 56 etc., giving the appropriate input/output speed ratio for maintaining constancy of output speed, at any input speed within the range corresponding to the limits of speed-ratio variation, the centrifugal forces of the balls being approximately proportional to the square of the input speed at a given output speed. This manner of governing for constant output speed is similar in principle to that of the first example, the centrifugal forces of the balls being substituted for the centrifugal hydraulic pressure generated in the rotary cavity 37 of Fig. 1. In the present (second) example, the net centrifugal effort opposed to the governor springs varies not only with the speed but with the radial distances of the balls 47, 52 from the axis of rotation, which depend on the relative axial displacement of the two unitary groups of cones, and this will be taken into account in computing the appropriate uniform or non-uniform rate of the springs.

The foregoing description with reference to the drawings is given by way of example only and not of limitation. Other modifications and forms of construction may be devised by those skilled in the art are included in the scope of the invention which is defined in the appended claims. For instance, some at least of the conical surfaces of both forms of construction described and illustrated may be replaced by cone-like surfaces of revolution having moderately curved generators, either convex or concave. In such a case, the conditions to be satisfied cannot be brought within the scope of simple general formulae such as the Equations 1 or 2 quoted above, which formulae define necessary relationships between the angles of true cones in the two described forms of construction. It can only be said that the geometrical characteristics of the cone-like members, when some at least of them have curved generators, must be so selected that relative axial displacement of unitary groups of elements, in response to control operation, does not entail such relative axial displacement of the elements of any such group, inter se, as would lead to loss of contact between a ball and any element it rolls on, or to a marked variation of the pre-load imposed on any such unitary group of elements.

I claim:

1. In a continuously variable speed ratio power transmission mechanism, a casing, three coaxial members rotatable independently of one another, of which the first and second are axially located with respect to each other and the third is axially displaceable relatively to the first and second members, the first and second members respectively bearing one and the other of two oppositely facing coniform surfaces of the same species (male or female) and the third member bearing two oppositely facing coniform surfaces of the opposite species to that of the coniform surfaces of the first and second members, the coniform surfaces being disposed to provide two V-shaped tracks facing axially in opposed directions, whose apical radii are variable simultaneously in opposed senses by axial displacement of the third rotatable member relatively to the other two rotatable members, a ball in rolling contact with each V-track, preloading means for retaining the balls in frictional engagement with the V-tracks, an input shaft whose torque is applied for driving one ball, and an output shaft whose torque is received from the other ball.

2. Mechanism as claimed in claim 1, including means for axially displacing the third rotatable member relatively to the other two rotatable members.

3. Mechanism as claimed in claim 1, including means for axially displacing the third rotatable member relatively to the other two rotatable members, said means being responsive to the speed of the input shaft to vary the speed of the output shaft in the opposite sense.

4. Mechanism as claimed in claim 1, in which the input and output shafts are perpendicular to the axis of the rotatable members and are respectively keyed to one and the other of the balls.

5. Mechanism as claimed in claim 1, in which the input and output shafts are coaxial and are respectively keyed to the first and second of the rotatable members.

6. In a continuously-variable speed ratio power transmission mechanism, a casing, a shaft journaled therein, a ball slidably keyed on the shaft, a pair of coaxial coniform-members facing the same way, being respectively male and female, their axis being perpendicular to the shaft and each coniform-member being free to shift axially with respect to the casing independently of the other, pre-loading means holding both coniform-members in rolling contact with the ball, and a second shaft coaxial with the coniform-members and constrained to rotate with one of them, the other coniform-member being an idler.

7. A continuously variable speed-ratio power transmission system having two similar sets of mechanism as claimed in claim 6, of which the casing, the second-mentioned shaft and the pre-loading means are common to both sets of mechanism, all the other mentioned elements being duplicated, and corresponding coniform-members (of the same type) of the two sets of mechanism being constrained to rotate with the common shaft.

8. Mechanism as claimed in claim 6, having means responsive to variation of the speed of one of the coniform-members for mutually displacing the coniform-members axially in the direction for varying their speed-ratio so as to maintain the speed of the other coniform-member constant.

9. In a continuously-variable speed ratio power transmission mechanism, a casing; a shaft journaled therein; a ball slidably keyed on the shaft; a pair of coaxial coniform-members facing the same way, being respectively male and female, their axis being perpendicular to the shaft and each coniform-member being free to shift axially with respect to the casing independently of the other; preloading means holding both coniform-members in rolling contact with the ball; a second shaft coaxial with the coniform-members and constrained to rotate with one of them, the other coniform-member being an idler; and means responsive to variation of the speed of one of the coniform-members for mutually displacing the coniform-members axially in the direction for varying their speed-ratio so as to maintain the speed of the other coniform-member constant, said means responsive to variation of the speed of said one coniform-member including a device for generating a hydraulic pressure which increases with the speed of that coniform-member, means for applying the hydraulic pressure to bring about mutual axial displacement of the coniform-members in one direction, and spring means tending to bring about mutual axial displacement of the coniform-members in the opposite direction.

10. In a continuously variable speed-ratio power transmission mechanism, a pair of rotative coaxial coniform members, one male and the other female, and both facing the same way, said members being supported for rotation independently of one another, and being mounted with freedom for mutual axial displacement; a ball in rolling contact with both rotative coniform members; preloading means holding the ball in contact with said coniform members and constraining the ball to rotate about an axis radial of said coniform members while rolling on them, said preloading means including a pair of non-rotative coniform members, male and female, respectively, which are coaxial with, and face the opposite way, to the rotative coniform members, the male non-rotative and female rotative coniform members being free for axial displacement relative to the male rotative and female non-rotative coniform members; and pre-loading spring means which press the non-rotative coniform members axially toward the rotative coniform members and thus grip the ball between them in rolling contact with the faces of all four coniform members.

11. A continuously variable speed-ratio power transmission system having two similar sets of mechanism as claimed in claim 10, but of differing geometrical characteristics, and in which the male and female non-rotative coniform-members of one set of mechanism are respectively located axially with respect to the male and the female non-rotative coniform-members of the other set of mechanism and the members of each pair of corresponding coniform-members, which members belong respectively to one and the other of the two sets of mechanism, are faced opposite ways, and the pre-loading spring means are common to both sets of mechanism, one pair of corresponding rotative coniform-members (of the same type), the members of which pair belong respectively to one and the other of the two sets of mechanism, being constrained to rotate together, and all the other elements mentioned in claim 10 being duplicated.

12. Mechanism as claimed in claim 10, in which the pre-loading spring means comprise two independent sets of spring means, of which one presses the female cone-rotative coniform-member towards the male rotative coniform-member and the other presses the male non-rotative coniform-member towards the female rotative coniform-member.

13. Mechanism as claimed in claim 10 wherein the rotative and non-rotative coniform members are cone members, and wherein the cone angles of the male non-rotative cone member and the female rotative cone member are equal, and wherein the cone angles of the male rotative and female non-rotative cone members are equal.

14. A continuously variable speed-ratio power transmission mechanism comprising a rotatable male coniform member, an independently rotatable female coniform member coaxial therewith and facing the same way, a ball in rolling contact with both said coniform members, two non-rotative coniform members coaxial with the rotative coniform members and in rolling contact with the ball, one being male and the other female and both being faced the opposite way to the rotative coniform members, a second rotatable male coniform member coaxial with the other coniform members and facing the opposite way to the first rotatable male coniform member, a second female coniform member facing the same way as the second rotatable male coniform member and coaxial therewith and rotatable independently with respect thereto, a second ball in rolling contact with the second male and female rotatable coniform members, a second non-rotatable male coniform member and a second non-rotatable female coniform member coaxial with and facing the opposite way to the second male and female rotatable coniform members, and in rolling contact with the second ball, means connecting one of the two second rotatable coniform members to the corresponding member of the first two rotatable coniform members for rotation therewith, a thrust bearing between the other member of the first two rotatable coniform members, and the corresponding member of the second two rotatable coniform members, pre-loading spring means operative to hold the two rotatable male coniform members and the two non-rotatable female coniform members into contact with the balls, these four coniform members constituting a first unitary group, and separate pre-loading spring means operative to hold the two rotatable female coniform members and the two non-rotatable male coniform members into contact with the balls, these last four coniform members constituting a second unitary group axially displaceable as a whole with respect to the first unitary group, an input shaft connected to one of the first two (male and female) rotatable coniform members, an output shaft connected to the corresponding member of the two second (male and female) rotatable coniform members, and means controlling the relative axial displacement of the two unitary groups of coniform members.

15. Mechanism as claimed in claim 10, having means responsive to variation of the speed of one of the coniform members for mutually displacing the coniform members axially in the direction for varying their speed-ratio so as to maintain the speed of the other coniform member constant.

16. Mechanism as claimed in claim 14, in which one of the two balls is heavier than the other and the means controlling the relative axial displacement of the two unitary groups of coniform members comprise spring means operative on said groups and tending to displace them mutually in the axial direction opposite to that in which they tend to be mutually displaced by the centrifugal radial pressure of the heavier ball on the female coniform members on which the ball rolls.

17. Mechanism as claimed in claim 16, in which the tension of the spring means, which tend to displace mutually the unitary groups of coniform members, is adjustable.

18. Mechanism as claimed in claim 16, in which the tension and rate of the spring means, which tend to displace mutually the unitary groups of coniform members, are so selected that equilibrium of the system comprising the unitary groups of coniform members, the two balls and the last-mentioned spring means is stable and is achieved at a constant speed of the output shaft for all speeds of the input shaft within the range of variation of input-shaft-speeds of which the mechanism is capable.

JACOBUS JOHANNES GERRITSEN.

REFERENCES CITED

The following references are of record in the file of this patent:

UNITED STATES PATENTS

| Number | Name | Date |
| --- | --- | --- |
| 1,718,846 | Arter | June 25, 1929 |
| 1,979,170 | Nardone | Oct. 30, 1934 |
| 2,412,351 | Mount | Dec. 10, 1946 |